Jan. 5, 1954

W. E. FRADY, JR 2,665,411

DOUBLE INTERPOLATION METHOD AND APPARATUS
FOR MEASURING TIME INTERVALS

Filed March 15, 1951

INVENTOR.
WILLIAM E. FRADY, JR.
BY
Nicholas T Volk
atty

Jan. 5, 1954 W. E. FRADY, JR 2,665,411
DOUBLE INTERPOLATION METHOD AND APPARATUS
FOR MEASURING TIME INTERVALS
Filed March 15, 1951 5 Sheets-Sheet 2

INVENTOR.
WILLIAM E. FRADY, JR.
BY

FIG-7

Jan. 5, 1954     W. E. FRADY, JR     2,665,411
DOUBLE INTERPOLATION METHOD AND APPARATUS
FOR MEASURING TIME INTERVALS
Filed March 15, 1951                              5 Sheets-Sheet 5

INVENTOR.
WILLIAM E. FRADY, JR.

Patented Jan. 5, 1954

2,665,411

UNITED STATES PATENT OFFICE 2,665,411

DOUBLE INTERPOLATION METHOD AND APPARATUS FOR MEASURING TIME INTERVALS

William E. Frady, Jr., Los Angeles, Calif., assignor to Hughes Tool Company, Houston, Tex., a corporation of Delaware Application March 15, 1951, Serial No. 215,690

14 Claims. (Cl. 324—68)

The present invention relates to a double interpolation method and apparatus for measuring time intervals and more particularly to a double interpolation method and apparatus for measuring time intervals wherein a single signal generator is utilized to produce both interpolation signals.

In copending United States patent application Serial No. 215,691 for "Method and Apparatus for Measuring Time Intervals," by D. Burbeck, filed March 15, 1951, there is set forth a double interpolation method and apparatus for measuring the time interval between a pair of spaced signals. According to the method of this application, a continuously running signal generator is utilized to measure the number of unit time intervals in the time interval to be measured, and a pair of vernier signal generators are utilized to measure the fractional time intervals remaining at each end of the time interval to be measured. The periods of the three generators are each different from, but close to, the others.

One of the vernier signal generators is actuated by the first signal of the pair of signals to produce a first series of vernier signals, while the other vernier signal generator is actuated by the second signal of the pair of signals to produce a second series of vernier signals. Measurement of each of the fractional time intervals is made by counting the numbers of vernier signals of each series occurring during the time intervals between the first signal of the series and coincidence between a signal of the series and a signal from the continuously running generator.

Since the fractional measurement will, therefore, be dependent upon the time delay in actuating the vernier signal generator, it is clear that any difference between the timedelays in actuating the vernier signal generators will introduce a direct error in the measurement of the total fractional time interval. Accordingly, great care must be exercised in controlling the time delay in each of the vernier generators, and in maintaining an equal delay in each vernier generator.

Furthermore, since the vernier signal generators are pulsed generators, they are susceptible to frequency drift which introduces a further error into the measurements. By utilizing two vernier signal generators, the possibility of error in the final result, due to frequency drift is twofold. Thus, if it is assumed that each generator has a maximum frequency drift in either direction of a predetermined percentage, the error introduced into the total measurement by frequency drift may have a value proportional to twice the predetermined percentage.

The present invention discloses a method and apparatus for measuring the time interval between a pair of spaced signals wherein a single vernier signal generator is utilized to measure both fractional time intervals. By utilizing the single vernier signal generator, the possibility of error due to frequency drift is reduced to a value directly proportional to the predetermined percentage. Furthermore, since a single vernier signal generator is used for both fractional time intervals, the time delay in actuating the generator is the same for each of the pair of input signals, and no error is introduced into the measurements because of this delay. Stated differently, any error introduced into the first fractional time interval measurement by the time delay will be compensated for by an equal and opposite error introduced into the second fractional time interval measurement by this delay. Accordingly, the use of a single vernier signal generator not only eliminates the necessity of accurate time delay control of a pair of generators, but also eliminates the necessity of employing a fixed time delay, since any delay will be compensated for by the system.

The basic principle of the invention resides in the fact that, by proper gating of the counters, a single frequency vernier signal may be utilized to produce indications of both of the desired fractional time intervals. The proper result may be obtained whether the period of the vernier signal generator is greater or less than that of the continuously running generator. In addition, by proper gating, the entire fractional time interval may be measured by a single fraction counter.

Accordingly, it is an object of the invention to provide a double interpolation method and apparatus for measuring time intervals which requires a minimum number of components and has a maximum accuracy.

Another object is to provide a double interpolation time interval measuring method and apparatus which employs a single vernier signal generator for performing both interpolations.

A further object of the invention is to provide a double interpolation time interval measuring method and apparatus which employs a single vernier signal generator having a period either greater or less than that of the continuously running signal generator.

Still another object is to provide a double interpolation time interval measuring method and apparatus which employs a single verier signal erator and which eliminates any ambiguity as he measurement of the unit time interval.

he novel features which are believed to be racteristic of the invention, both as to its anization and method of operation, together h further objects and advantages thereof will better understood from the following descrip- considered in connection with the accom- ly'ng drawings in which several embodiments the invention are illustrated by way of ex- ples. It is to be expressly understood, how- r, that the drawings are for the purpose of stration and description only, and are not in- ded as a definition of the limits of the inven- 1.

Figure 1:
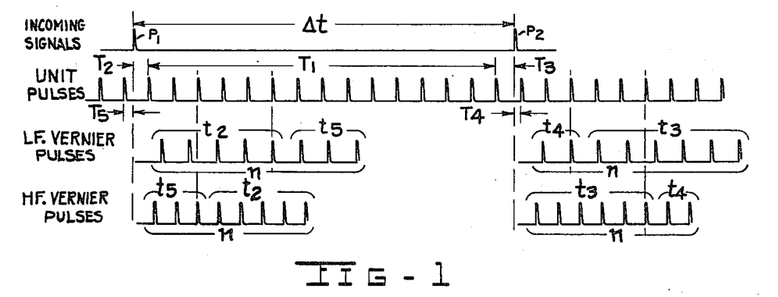
Fig. 1 is a composite diagram of waveforms for laining the basic principle of the present in- ition.

Referring now to the drawings, there is shown . Fig. 1 a composite diagram of waveforms r illustrating and explaining the basic prin- ple of the present invention. In Fig. 1, incom- g pulses $P_1$ and $P_2$ are separated by a time in- rval $\Delta t$ to be measured. According to the uble interpolation system, time interval $\Delta t$ is ivided into three components, a unit time in- rval $T_1$ and a pair of fractional time intervals 2 and $T_3$. Unit interval $T_1$ is determined by ie number of unit signals or pulses occurring uring the time interval $\Delta t$. Fractional time iterval $T_2$ is the time interval between pulse $P_1$ nd the first unit pulse occurring during interval t. Fractional time interval $T_3$ is the time in- erval between pulse $P_2$ and the last unit pulse ccurring during interval $\Delta t$.

A vernier frequency signal generator is used measure intervals $T_2$ and $T_3$, the period of e vernier signal generator being related to the eriod of the unit signal generator in accordance ith the relationship $$\frac{n+1}{n} \text{ or } \frac{n-1}{n}$$

where $n$ is an integer. Thus, the number of ernier signals or pulses occurring during the nterval between pulse $P_1$ and a first coincidence etween a unit pulse and a vernier pulse is epresentative of interval $T_2$, if the vernier sig- al generator is initially triggered by pulse $P_1$. Similarly, if the vernier signal generator is fi- nally triggered by pulse $P_2$, the number of vernier signals or pulses occurring during the interval between pulse $P_2$ and a second coincidence be- tween a unit pulse and a vernier pulse is repre- sentative of interval $T_3$.

Referring again to Fig. 1, consideration is given first to the case of the low frequency vernier, that is the period of the vernier signal genera- tor being related to the period of the unit sig- nal generator in accordance with the relation- ship $$\frac{n+1}{n}$$

In the illustrated example, the period of the unit signal generator is represented as being equivalent to ¼ inch, and $n$ is 8. Therefore, the period of the vernier signal generator is repre- sented as being equivalent to $\frac{9}{32}$ inch. It is un- derstood, of course, that the selected periods and value of $n$ are merely illustrative and that any other values may be chosen.

As shown in Fig. 1, the number of vernier pulses $t_2$ occurring between pulse $P_1$ and the first coin- cidence is directly proportional to interval $T_2$, and, in terms of unit intervals, is equal to the pulse count $t_2$ divided by $n$. On the other hand, the number of vernier pulses $t_5$ occurring be- tween the first coincidence and the $n$th vernier pulse is directly proportional to interval $T_5$, where $T_2$ plus $T_5$ equals one unit time interval. Thus, it is seen that interval $T_2$ may be measured by counting either the number of vernier pulses $t_2$ between pulse $P_1$ and the first coincidence, or the number of vernier pulses $t_5$ occurring be- tween the first coincidence and the $n$th vernier pulse. In the latter case, the measurement of interval $T_2$, in terms of unit intervals, is equal to 1 minus the recorded count $t_5$ divided by $n$.

Interval $T_3$ may be measured in a manner simi- lar to that outlined above. It is to be noted, however, that in measuring interval $T_3$, the num- ber of vernier pulses $t_4$ occurring between pulse $P_2$ and the second coincidence is directly propor- tional to interval $T_4$. Accordingly, if the count recorded is between the incoming pulse and co- incidence in each instance, the total fractional count, in terms of unit intervals, is 1 plus the difference between the counts divided by $n$, that is $$1 + \frac{t_2 - t_4}{n}$$

If it is assumed that a high frequency vernier is used, that is the period of the vernier signal generator being related to the period of the unit signal generator in accordance with the rela- tionship $$\frac{n-1}{n}$$

the results obtained are opposite to those ob- tained in the case of the low frequency vernier signal generator. Thus, as indicated in Fig. 1, the number of vernier pulses $t_5$ between pulse $P_1$ and the first coincidence is directly proportional to interval $T_5$, while the number of pulses $t_3$ occurring between pulse $P_2$ and the second coin- cidence is directly proportional to interval $T_3$.

Accordingly, if the count recorded is between the incoming pulse and concidence in each in- stance, the total fraction count, in terms of unit intervals, is 1 plus the difference between the counts divided by $n$, that is $$1 + \frac{t_3 - t_5}{n}$$

It is thus seen that, by proper gating of the fraction counter, intervals $T_2$ and $T_3$ may be measured by a single vernier signal generator.

Figure 2:
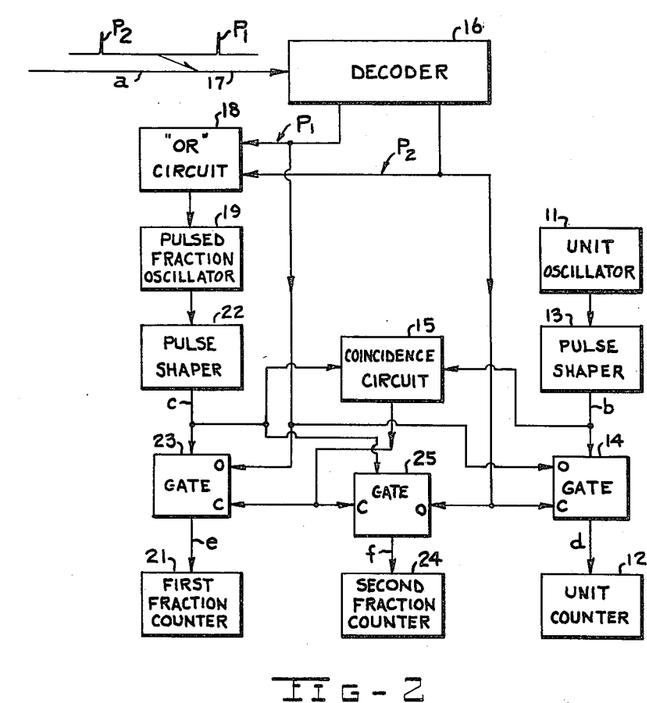
Fig. 2 is a block diagram of one embodiment the invention.

Referring now to Fig. 2, there is shown one form of double interpolation system according to the present invention which employs a single vernier frequency oscillator and a pair of fractional counters. In Fig. 2, the unit measuring section of the system comprises a continuously running unit pulse oscillator 11 coupled to a unit counter 12 through a pulse shaper 13 and a gate 14. The output of pulse shaper 13 is applied to one input terminal of a coincidence circuit 15. A source, not shown, of incoming pulse $P_1$ and $P_2$ is connected to the input terminal of a decoder 16 through conductor 17, the output terminals of decoder 16 being connected, respectively, to the input terminals of an "or" circuit 18. Decoder 16 is any suitable circuit for dividing pulses $P_1$ and $P_2$ into two separate lines, one suitable decoder being illustrated in Fig. 2 of copending United States patent application Serial No. 215,692 for "Method and Apparatus for Measuring Time Intervals," by H. Brooks and D. Burbeck filed March 15, 1951.

The output terminal of "or" circuit 18 is connected to the input end of the fraction measuring section of the system. This section includes a pulsed oscillator 19 for initiating oscillations of oscillator 19, the output of oscillator 19 being applied to a first fractional counter 21 through a pulse shaper 22 and a gate 23. The output of oscillator 19 also is applied to a second fraction counter 24 through pulse shaper 22 and a gate 25. The output terminal of pulse shaper 22 is connected to the other input terminal of coincidence circuit 15.

The output terminals of decoder 16 also are coupled to the opening and closing control terminals, respectively, of gate 14, so that gate 14 is opened by pulse $P_1$ and closed by pulse $P_2$. The opening control terminals of gates 23 and 25 also are connected to the output terminals, respectively, of decoder 16, so that gate 23 is opened by pulse $P_1$, and gate 25 is opened by pulse $P_2$. The output terminal of coincidence circuit 15 is connected to the closing control terminals of gates 23 and 25 so that closing of gates 23 and 25 occurs whenever a signal appears in the output of coincidence circuit 15.

Coincidence circuit 15 may be any suitable circuit capable of producing an output pulse whenever the pulses on its input terminals coincide. One suitable circuit is that illustrated in Figs. 10–18 on page 381 of vol. 19 of the M. I. T. Radiation Laboratory Series, published in 1949 by McGraw-Hill Book Company, which is hereby made a part of this application.

Figure 3:
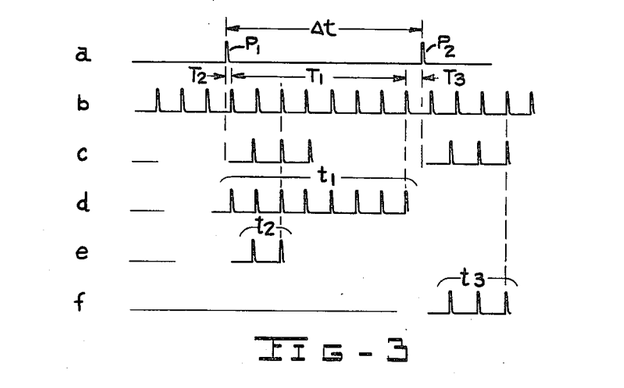
Fig. 3 is a composite diagram of waveforms urring at various points in the circuit of . 1.

In operation, referring to Fig. 3, the time interval to be measured is the interval $\Delta t$ between pulses $P_1$ and $P_2$ as they occur at point $a$ in the system of Fig. 2. The interval $\Delta t$ is divided into three components, a unit time interval $T_1$, a first fractional time interval $T_2$ between pulse $P_1$ and the initial pulse appearing at point $b$ during the time interval to be measured, and a fractional time interval $T_3$ between the final pulse appearing at point $b$ during the time interval to be measured and pulse $P_2$. The unit time interval $T_1$ is measured by unit counter 12, and fraction time intervals $T_2$ and $T_3$ are indicated by fractional counters 21 and 24, respectively.

Oscillator 11 is continuously running and produces a first series of uniformly spaced pulses at point $b$, the output end of pulse shaper 13. Upon the appearance of pulse $P_1$ at the output of decoder 16, gate 14 is opened and the first series of pulses appears at point $d$, the input of unit counter 12. Gate 14 remains open until the appearance of pulse $P_2$ at the output of decoder 16. Thus, the total number of pulses $t_1$ appearing at point $d$ and counted by unit counter 12 represents, in terms of the period of oscillator 11, the unit time interval $T_1$.

The appearance of pulse $P_1$ at the output of decoder 16 triggers oscillator 19 and initiates a second series of uniformly spaced pulses at point $c$, the output of pulse shaper 22. Pulse $P_1$ also opens gate 23 so that the second series of pulses appears at point $e$, the input of fraction counter 21. Gate 23 remains open until coincidence occurs between a pulse of the first series at point $b$ and a pulse of the second series at point $c$. At this coincidence, a signal appears in the output of coincidence circuit 15 and closes gate 23. Accordingly, the number of pulses $t_2$ appearing at point $e$ and counted by first fraction counter 21 are representative of the fractional time interval $T_2$.

If the frequency of oscillator 11 is higher than that of oscillator 19, that is the ratio of the frequencies of oscillators 11 and 19 is in accordance with the relationship $$\frac{n+1}{n}$$

where $n$ is an integer, the count $t_2$ produced in the fraction counter 21 will be directly proportional to the fractional time interval $T_2$. On the other hand, if the frequency of oscillator 11 is lower than the frequency of oscillator 19, that is the ratio of the frequencies of oscillators 11 and 19 is in accordance with the relationship $$\frac{n-1}{n}$$

where $n$ is an integer, the count $t_2$ recorded by fraction counter 21 is proportional to $1-T_2$.

Although the output of pulse shaper 22 also is applied to gate 25, no pulses appear at point $f$ the input to fraction counter 24, since gate 25 remains closed until the appearance of pulse $P_2$. At the appearance of pulse $P_2$ at the output of decoder 16, oscillator 19 is again triggered and produces a third series of pulses at point $c$. With gate 25 opened by pulse $P_2$, this third series of pulses appears at point $f$, the input of fraction counter 24. Gate 25 remains open until a second coincidence between a pulse at point $b$ and a pulse at point $c$, at which time a pulse appears at the output end of coincidence circuit 15 to close gate 25. Accordingly, the series of pulses $t_3$ appearing at point $f$ and counted by fraction counter 24 is representative of the fractional time interval $T_3$.

The relationship between the count of fraction counter 24 and interval $T_3$ is the reverse of that between the count of counter 21 and interval $T_2$. Stated differently, if the frequency of oscillator 11 is higher than that of oscillator 19, the count $t_3$ of fraction counter 24 is proportional to $1-T_3$, while if the frequency of oscillator 11 is lower than that of oscillator 19, the count $t_3$ of fraction counter 24 is directly proportional to interval $T_3$.

It is thus seen that the system of Fig. 2 enables the measurement of the time interval between pulses $P_1$ and $P_2$ by a single vernier frequency oscillator. If oscillator 19 has a lower frequency in that of oscillator 11, as indicated in Fig. 3, total fractional count, in terms of unit intervals or counts, is equal to $$1 + \frac{t_2 - t_3}{n}$$

oscillator 19 has a higher frequency, the total fractional count, in terms of unit intervals, is equal to $$1 + \frac{t_3 - t_2}{n}$$

either case, in obtaining the total count of interval $\Delta t$, it becomes necessary to add one count the unit count $t_1$ to obtain the exact result. However, referring to Fig. 3, it can be seen that the unit count recorded in counter 12 is actually one greater than the number of unit time intervals between pulses $P_1$ and $P_2$. Accordingly, the count of counter 12 inherently includes the extra unit count.

Referring again to Fig. 3, it can be seen that oscillator 19 was chosen as having a time delay equal to one period of its oscillations. However, as pointed out above, the use of a single vernier oscillator permits the time delay of oscillator to be chosen as any desired value. This result follows from the fact that the total fractional count at any measurement is proportional to the difference between the two fractional counts, that is either $t_3-t_2$ or $t_2-t_3$. Thus, if the time delay were either shorter or longer, the gain or loss in count $t_2$ would be compensated for by the equal gain or loss in count $t_3$, the difference remaining constant.

The total count of interval $\Delta t$, in terms of unit intervals, is, therefore, $$t_1 + \frac{t_2 - t_3}{n}$$

or the low frequency vernier, and $$t_1 + \frac{t_3 - t_2}{n}$$

or the high frequency vernier. The necessary addition and subtraction may be performed in any suitable manner, such as visually or electronically.

Figure 4:
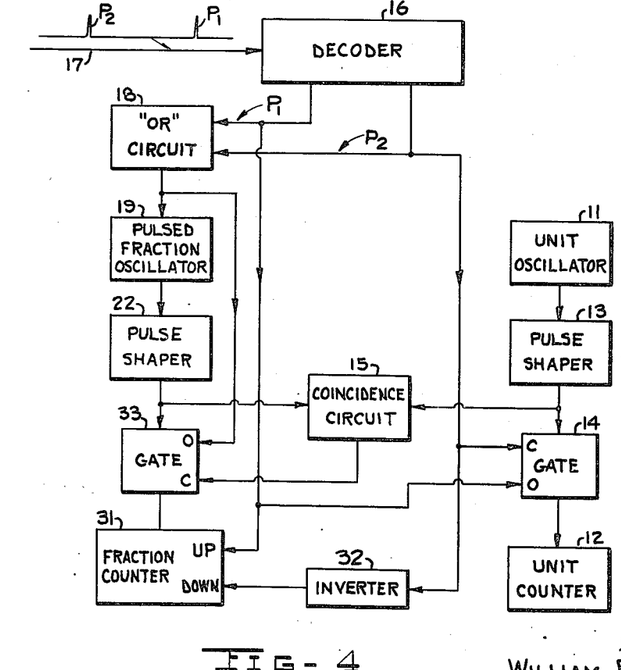
Fig. 4 is a block diagram of a modification of e circuit of Fig. 1, in which a single up-down ction counter is employed.

Referring now to Fig. 4, there is shown a modification of the system of Fig. 2, wherein a single counter and a single gate are utilized for counting the fractional time intervals $T_2$ and $T_3$. The unit counting section of the system of Fig. 4, comprising oscillator 11, shaper 13, gate 14 and counter 12, is identical with and operates in the same manner as its counterpart in Fig. 2. Similarly the fraction pulse generator, comprising "or" circuit 18, oscillator 19 and shaper 22, corresponds to the generator of Fig. 2. Coincidence circuit 15, decoder 16 and input conductor 17 are connected in the same manner as the corresponding elements of Fig. 2.

In Fig. 4, a single fraction counter 31 is employed for counting intervals $T_2$ and $T_3$, counter 31 being capable of counting either up or down. Although any up-down counter is contemplated by the present invention, one suitable form is that shown in Figs. 4 and 5 on pages 963 and 964 of "Electrical Engineering," November 1949, in an article entitled "The Binary Quantizer" by Kay Barney. In this counter, up or forward counting is produced by an incoming positive pulse, while down or backward counting is produced by an incoming negative pulse. Accordingly, it is merely necessary to invert one of pulses $P_1$ and $P_2$ before applying it to counter 31. This is indicated schematically in Fig. 4 by an inverter 32 in the line between decoder 16 and the down control of counter 31. Obviously, many conventional circuits will perform the function of inverter 32, one such circuit being a common amplifier.

Coupled between pulse shaper 22 and counter 31 is a gate 33 for controlling the transmission of the vernier pulse series to counter 31. The opening control terminal of gate 33 is connected to the output terminal of "or" circuit 18, so that gate 33 opens each time either pulse $P_1$ or pulse $P_2$ appears at the output of "or" circuit 18. The closing control terminal of gate 33 is connected to the output terminal of coincidence circuit 15, so that gate 33 closes at each coincidence.

In operation, the unit count $t_1$ is produced in the same manner as in the circuit of Fig. 2. The fraction counts are produced in counter 31 in the same manner as in counters 21 and 24 of Fig. 2. Thus, if oscillator 19 has the lower frequency, counter 31 is arranged as shown in Fig. 4, and the total count of counter 31 is proportional to $t_2-t_3$. On the other hand, if oscillator 19 has the higher frequency, pulse $P_1$ is applied to inverter 32, and the count of counter 31 is proportional to $t_3-t_2$.

Figure 5:
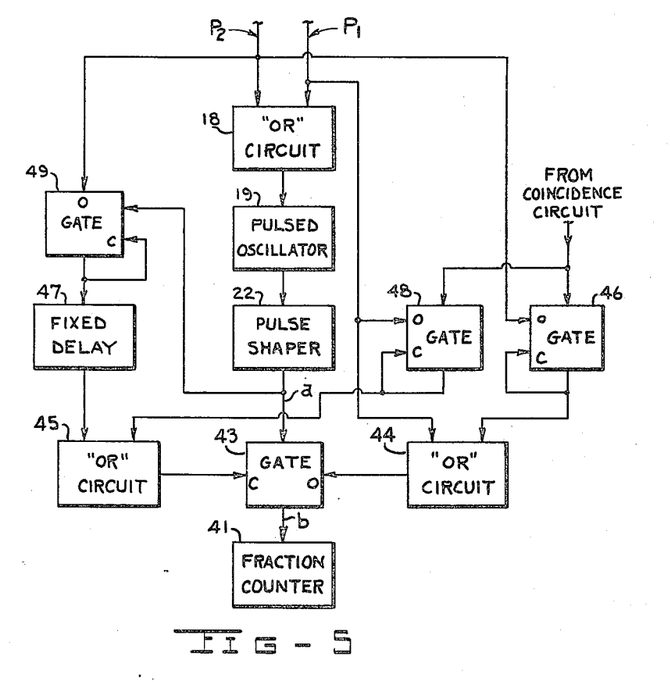
Fig. 5 is a block diagram of a modification of e fraction counting section of the circuit of g. 1, wherein a single conventional fraction unter is employed.

In each of the embodiments thus far described, it is necessary to perform a subtraction operation in order to obtain the fractional count, this subtraction being performed externally, as in Fig. 2, or being performed by a particular type of counter, as in Fig. 4. The system of Fig. 5 includes a single fractional counter and means for counting intervals $T_2$ and $T_3$ directly on this single counter by simple addition. In the system of Fig. 5, only a lower frequency vernier oscillator may be used, that is the ratio of the frequencies of the oscillators is in accordance with the relationship $$\frac{n+1}{n}$$

where $n$ is an integer.

Referring now to Fig. 5, only the fraction measuring section of the system is illustrated, since the unit measuring section to be employed is identical with that of Fig. 2 and Fig. 4. Incoming pulse $P_1$ and $P_2$ are applied to the input terminals of "or" circuit 18, the output terminal of circuit 18 being connected to the input terminal of pulsed oscillator 19. Circuit 18, oscillator 19 and pulse shaper 22 are identical with, and perform the same function as their counterparts in Figs. 2 and 4, namely the production of two series of pulses at the output of shaper 22. The output of shaper 22 is applied to a counter 41 through a gate 43.

Gate 43 has its opening control terminal connected to the output terminal of "or" circuit 44, and its closing control terminal connected to the output terminal of "or" circuit 45. Pulse $P_1$ is applied to one input terminal of circuit 44, the other input terminal of circuit 44 being connected to the output terminal of a gate 46. Pulse $P_2$ is applied to the opening control terminal of a gate 49 which has its output terminal connected to its closing control terminal and, through a fixed delay circuit 47, to one input terminal of circuit 45. The other input terminal of circuit 45 is connected to the output terminal of a gate 48. Pulses $P_1$ and $P_2$ are applied to the opening control terminals of gates 43 and 46, respectively, the closing control terminals of gates 46 and 48 being connected to their respective output terminals. The output of the coincidence circuit, not shown, is applied to the input terminal of each of gates 46 and 48.

Figure 6:
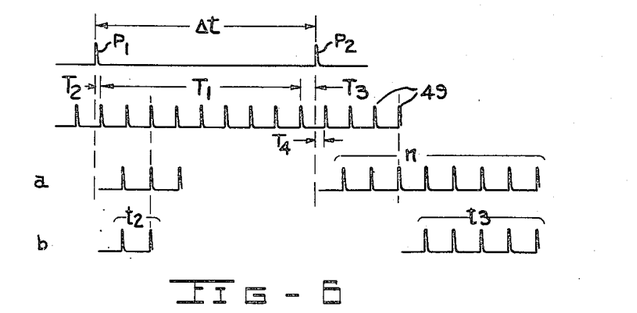
Fig. 6 is a composite diagram of waveforms curring at various points in the circuit of g. 5.

In operation, referring to Fig. 6, pulses $P_1$ and $P_2$ are separated by a time interval $\Delta t$, and pulses 49, the output of the unit oscillator and the unit pulse shaper, are again used to measure the unit time interval $T_1$. Oscillator 19 is initially triggered by pulse $P_1$ to produce a first series of pulses at point $a$, and finally triggered by pulse $P_2$ to produce a second series of pulses at point $a$. Pulse $P_1$ is also applied to gate 43 through circuit 44, and the first series of pulses will appear at point $b$, the input to counter 41. In addition, pulse $P_1$ is applied to gate 46 to open gate 48. Upon coincidence between a pulse from shaper 22 and a unit pulse, a signal appears at the output of the coincidence circuit and is applied to gates 46 and 48. With gate 48 open, this signal is applied through circuit 45 to close gate 43. Accordingly, the total number of pulses $t_2$ of the first series appearing at point $b$ and counted by counter 41 is representative of the interval $T_2$. If the frequency of oscillator 19 is related to the frequency of the unit oscillator in accordance with the relationship $$\frac{n}{n+1}$$

as set forth above, the count $t_2$ produced at point $b$ is directly proportional to interval $T_2$.

Upon the appearance of pulse $P_2$, oscillator 19 is again triggered and produces a second series of pulses at point $a$. Simultaneously, gate 46 is opened, and pulse $P_2$ is applied to delay circuit 47. Gate 43 remains closed, however, since no pulse appears at the input of circuit 44. Upon a second coincidence between a pulse at point $a$ and a pulse from the unit oscillator, as indicated in Fig. 6, a signal appears at the input of gate 46 and passes through gate 46 and circuit 44 to open gate 43. Gate 43 remains open until pulse $P_2$ reaches the output of delay circuit 47, at which time pulse $P_2$ passes through circuit 45 to close gate 43. Thus, the number of pulses of the second series appearing at point $b$, and recorded by counter 41, is representative of time interval $t_3$.

Actually, under the assumption of the lower frequency for oscillator 19 stated above, the number of pulses of the second series occurring during the interval between pulse $P_2$ and the second coincidence is directly proportional to time interval $T_4$, where, in terms of unit intervals, $1-T_4=T_3$. In other words, in terms of fractional counts, $t_4=n-t_3$. Accordingly, if delay circuit 47 delays pulse $P_2$ for a period of time equal to the time interval between $n$ pulses from oscillator 19, the count $t_3$ of the second series recorded in counter 41 will be directly proportional to interval $T_3$. The total count of interval $\Delta t$ in the system of Fig. 5, in terms of unit intervals, is, therefore, equal to the count $t_1$ of the unit counter plus the count $t_2+t_3$ of counter 41 divided by $n$. As in the previous embodiments, the time delay of oscillator 19 will not effect the total fractional count, since any change in count $t_2$ due to the delay will produce an equal and opposite change in count $t_3$, and since the total fractional count is proportional to $t_2+t_3$.

It is apparent that the system of Fig. 5 does not require the addition of one unit to the count recorded in the unit counter. The removal of this surplus unit count may be accomplished by delaying the opening of the gate coupled to the unit counter for a time interval equal to one period of the unit pulse oscillator. Any suitable delay network may be employed for accomplishing the delay. In this manner, the recorded unit count will be exactly equal to unit time interval $T_1$.

Figure 7:
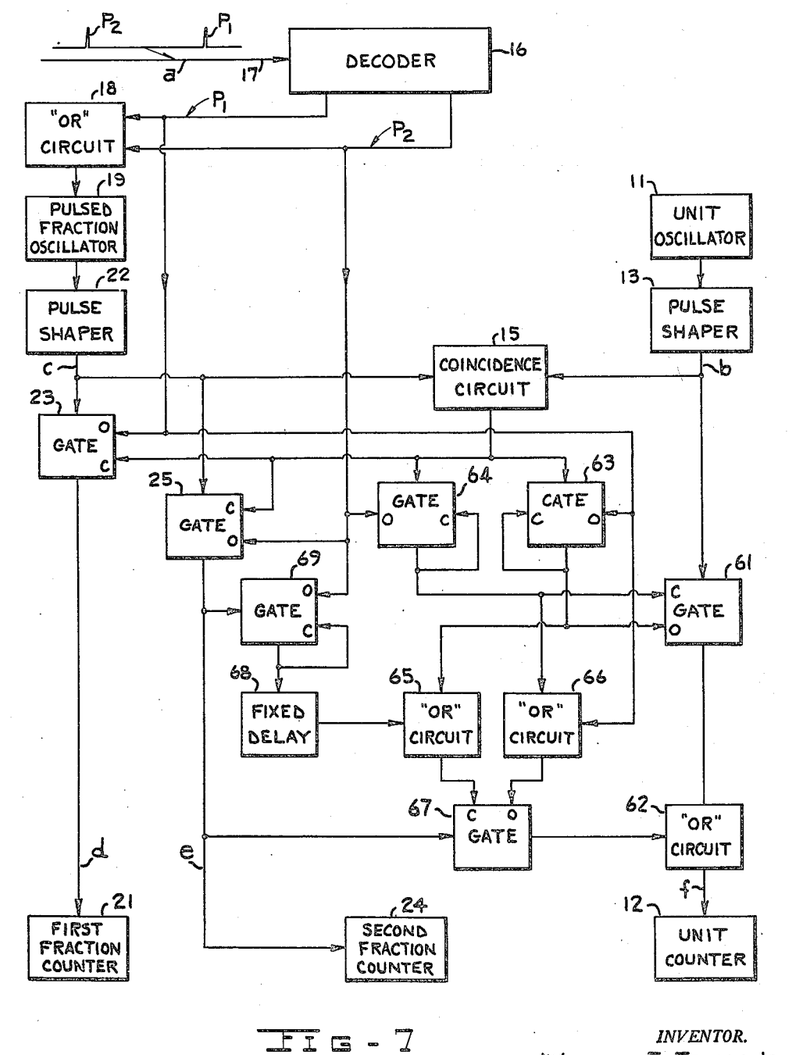
Fig. 7 is a block diagram of non-ambiguous rcuit according to the present invention.

In the embodiments of the invention thus far described, the fact that either or both of pulse $P_1$ and $P_2$ may occur in time proximity to one of the pulses from the unit pulse oscillator introduces a possibility of error in the recorded unit count. Thus, if pulse $P_1$ occurs close to one of the unit pulses, the initial unit pulse may be missed, or an additional unit pulse may be counted. A similar situation may arise if pulse $P_2$ occurs close to one of the unit pulses. An ambiguity is, therefore, introduced into the recorded unit count. Fig. 7 is a modification of the system of Fig. 2 for removing this ambiguity with respect to the unit count.

Referring now to Fig. 7 the fraction measuring section comprising decoder 16, conductor 17, "or" circuit 18, fraction oscillator 19, pulse shaper 22, gates 23 and 25, and counters 21 and 24, is identical with and performs the same function as the fraction counting section of Fig. 2. Similarly, unit oscillator 11, pulse shaper 13, coincidence circuit 15 and counter 12 are identical with their counterparts in Fig. 2. Pulse shaper 13 is connected to counter 12 through a gate 61 and an "or" circuit 62.

The output of coincidence circuit 15, besides being applied to the closing control terminals of each of gates 23 and 25, as in the system of Fig. 2, is applied to the input end of each of gates 63 and 64. The output terminal of gate 63 is connected to its closing control terminal, to the opening control terminal of gate 61, and to one input terminal of "or" circuit 65. The output terminal of gate 64 is connected to its closing control terminal, to the closing control terminal of gate 61, and to one input terminal of an "or" circuit 66. Pulses $P_1$ and $P_2$ are applied to the opening control terminals, respectively, of gates 63 and 64.

Circuit 66 has its output terminal connected to the opening control terminal of a gate 67, pulse $P_1$ being applied to the other input terminal of circuit 66. The output of gate 25 is applied to the other input terminal of circuit 65 through a gate 69 and a fixed delay circuit 68, circuit 65 having its output terminal connected to the closing control terminal of gate 67. The input and output terminals of gate 67 are connected, respectively, to the output terminal of pulse shaper 22 and to the other input terminal of circuit 62. Pulse $P_2$ is applied to the opening control terminal of gate 69 which has its output terminals connected to its closing control terminal.

Figure 8:
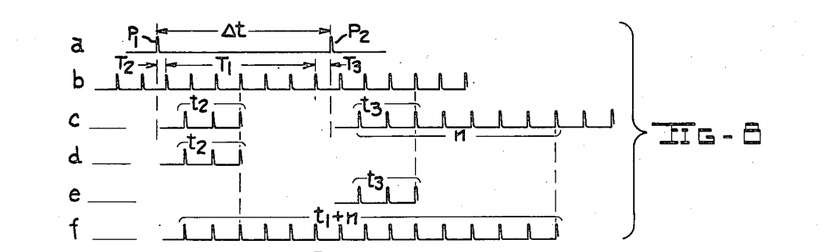
Fig. 8 is a composite diagram of waveforms curring at various points in the circuit of Fig. 7.

In operation, referring to Fig. 8, the fractional intervals $T_2$ and $T_3$ are measured by means of counter 21 and 24, respectively, in a manner identical with that of the system of Fig. 2. Thus, the pulses $t_2$ appearing at point $d$, and recorded by counter 21, are representative of the interval $T_2$, and the pulses $t_3$ appearing at point $e$, and recorded by counter 24, are representative of the interval $T_3$. Whether the count of counter 21 or counter 24 is to be subtracted depends upon the relationship of the frequencies of oscillators 11 and 19, as described in connection with the system of Fig. 2.

In order to eliminate the ambiguity as to the initial count recorded in counter 12, this counter initially counts the pulses appearing at point $c$, the output of pulse shaper 22. This operation is omplished by opening gate 67 with pulse P₁, that the pulses at point c pass through gate and circuit 62 to point f, the input end of nter 12. Gate 67 remains open until the first ncidence between a pulse at point c and a pulse point b, the output end of pulse shaper 13. this first coincidence, a signal appears at the put end of coincidence circuit 15 and is applied to gate 67, through gate 63 and circuit 65, close gate 67. In this manner, counter 12 initially counts the pulses occurring at point c during the interval between pulse P₁ and the first ncidence.

At the first coincidence, the output signal from ncidence circuit 15 is applied to gate 61, rough gate 63, to open gate 61. With gate 61 en, the pulses appearing at point b pass rough gate 61 and circuit 62 to point f, the input end of counter 12. Thus, counter 12 begins counting the unit pulses from point b and continues to count these pulses until a second coincidence occurs between a pulse at point b and a pulse at point c.

Prior to the second coincidence, pulse P₂ appears at the output end of decoder 16 and opens gates 64 and 69 and triggers oscillator 19. With gate 69 open, the first pulse appearing at point e passes through gate 69 and enters delay circuit 8. Thus, when the second coincidence occurs, indicated in Fig. 8, the output signal from incidence circuit 15 passes through gate 64 to close gate 61, and passes through gate 64 and rcuit 66 to open gate 67. With gate 61 closed, the pulses at point b no longer reach point f, hile with gate 67 open, the pulses at point c ass through gate 67 and circuit 62 to point f. In this manner, counter 12 stops counting unit ulses at the second coincidence and begins ounting the pulses appearing at point c. Counter 12 continues to count the pulses appearing t point c until a fixed time interval after the ppearance of the first pulse at point e, as determined by delay circuit 68. After this fixed nterval, this first pulse appears at the output nd of circuit 68 and passes through circuit 65 o close gate 67. It is thus seen that counter 12 initially counts the first series of pulses at point c during the time interval between pulse P₁ and the first coincidence, intermediately counts the series of pulses at point b during the time interval between the first and second coincidences, finally counts the second series of pulses at point c during the time interval between the second coincidence and a point a fixed time interval after pulse P₂. The delay introduced by circuit 68 is preferably equal to n times the period of oscillator 19, so that counter 12 stops counting the pulses of the second series at the instant of arrival at point c of the nth pulse of the second series, as shown in Fig. 8.

In this manner, counter 12 switches to counting unit pulses only after the unit pulses have been definitely related in time to the pulses at point c, and, since the pulses at point c are started by pulse P₁, the ambiguity as to the initial unit count is removed. Similarly, counter 12 stops counting unit pulses at the instant the unit pulses have been definitely related to the series of pulses started by pulse P₂, and no ambiguity exists as to the final unit count. It is to be noted that the number of pulses initially counted by counter 12 is actually one less than the number of pulses appearing at point b during the time interval between pulse P₁ and the first coincidence. However, since the number of time intervals is always one less than the number of pulses, the count recorded in counter 12 would be correct. Thus, in determining the exact unit count, it becomes necessary to subtract n from the count recorded by counter 12, or preset counter 12 to $-n$ before the time measurement is made.

It should be noted that, as in the previous embodiments, any variations in the time delay in actuating oscillator 19 will not effect the total measurement of the fractional time intervals. Furthermore, since counter 12 measures the unit time interval by initially counting vernier pulses during the interval between pulse P₁ and the first coincidence and finally counting vernier pulses during the interval between the second coincidence and the nth pulse of the second series of vernier pulses, any error introduced into the unit count, by time delay in initiating the first series of vernier pulses, will be compensated for by the equal and opposite error introduced into the final counting step by the delay.

It is clear that the unit counting system of Fig. 7 may be applied to the system of Fig. 4 as well as to that of Fig. 2. In modifying the system of Fig. 4 in this manner, the fraction counting section would be the same, and the unit counting section would be identical with that of Fig. 7.

Figure 9:
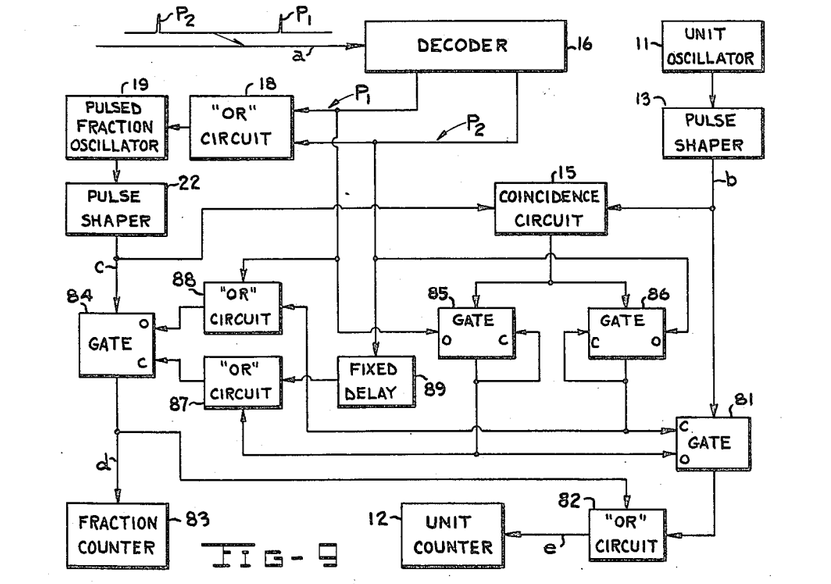
Fig. 9 is a block diagram of a modification of ie circuit of Fig. 7.

Referring now to Fig. 9, there is shown another embodiment of the present invention which includes both the non-ambiguous feature and the single fraction counter. In Fig. 9, unit oscillator 11, unit counter 12, pulse shaper 13, decoder 16, "or" circuit 18, oscillator 19, pulse shaper 22 and coincidence circuit 15 are identical with their counterparts in Fig. 2. The output of pulse shaper 13 is applied to counter 12 through a gate 81 and an "or" circuit 82. The output of pulse shaper 22 is applied to a counter 83 through a gate 84.

The output terminal of coincidence circuit 15 is connected to the input terminals of a pair of gates 85 and 86, the output terminals of gates 85 and 86 being connected to their respective closing control terminals. The output terminal of gate 85 is also connected to the opening control terminal of gate 81 and to one input terminal of an "or" circuit 87. The output terminal of gate 86 is also connected to the closing control terminal of gate 81 and to one input terminal of an "or" circuit 88. Pulse P₁ is applied to the opening control terminal of gate 85, and to the other input terminal of circuit 88. Pulse P₂ is applied to the opening control terminal of gate 86, and to the input terminal of circuit 87 through a fixed delay circuit 89 similar to delay circuit 68 of Fig. 7. The output terminals of circuits 87 and 88 are applied to the closing and opening control terminals, respectively, of gate 84. The output of gate 84, in addition to being applied to counter 83, is applied to counter 12 through circuit 82.

Figure 10:
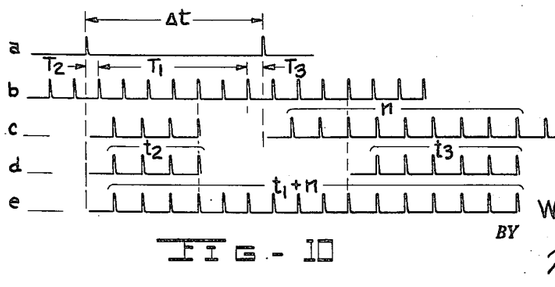
Fig. 10 is a composite diagram of waveforms curring at various points in the circuit of Fig. 9.

In operation, referring to Fig. 10, unit oscillator 11 is continuously running and produces a first series of pulses at point b, the output end of pulse shaper 13. Prior to the time pulse P₁ appears at point a, the input end of decoder 16, gates 81 and 84 are closed and no pulses have been recorded in either counter 12 or counter 83. Upon the appearance of pulse P₁, gates 84 and 85 are opened and oscillator 19 is triggered. Triggering of oscillator 19 produces a second series of pulses at point c which pass through gate 84 to point d, the input end of counter 83. This second series of pulses also appears at point e, the input end of counter 12, by passing through gate 84 and circuit 82.

At a first coincidence between a pulse at point $b$ and a pulse at point $c$, a signal appears in the output of coincidence circuit 15, and passes through open gate 85 to open gate 81. This signal also passes through gate 85 and circuit 87 to close gate 84. Thus, the initial count $t_2$ recorded in counter 83 is representative of fractional time interval $T_2$. If oscillator 19 has a lower frequency than that of oscillator 11, as set forth in connection with the embodiment of Fig. 4, the initial count $t_2$ of counter 83 is directly proportional to interval $T_2$.

With gate 81 open and gate 84 closed, counter 12 stops counting the pulses of the second series and begins counting the pulses of the first series. Counter 12 continues to count the pulses of the first series until a second coincidence between a pulse at point $b$ and a pulse at point $c$. Prior to the second coincidence pulse $P_2$ arrives and opens gate 86 and triggers oscillator 19. This triggering of oscillator 19 produces a third series of pulses at point $c$, as indicated in Fig. 10. Upon the second coincidence, the signal appearing at the output end of coincidence circuit 15 passes through gate 86 and closes gate 81. Simultaneously, the signal at the output end of coincidence circuit 15 passes through gate 86 and circuit 88 to open gate 84. Thus, at the second coincidence, counter 12 stops counting the pulses of the first series and begins counting the pulses of the third series. Furthermore, with gate 84 open, counter 83 also begins to count the pulses of the third series.

Each of counters 12 and 83 continues to count the pulses of the third series until pulse $P_2$ reaches the output end of delay circuit 89. As in the embodiments of Figs. 5 and 7, delay circuit 89 introduces a delay equal to the time interval between $n$ pulses from oscillator 19. Thus, as in the embodiment of Fig. 5, the second fractional count $t_3$ recorded in counter 83 is proportional to interval $T_3$, as shown in waveform $a$ in Fig. 10. Furthermore, as in the embodiment of Fig. 7, the total count $t_1+n$ recorded in counter 12 is equal to $T_1+n$. The total count of interval $\Delta t$, in terms of the unit count, is then equal to the count $t_1+n$ recorded in counter 12 minus $n$, plus the count $t_2+t_3$ recorded in counter 83 divided by $n$.

It is thus seen that the present invention provides a method and apparatus for measuring time intervals, the method and apparatus providing a single vernier or fraction oscillator for interpolating at each end of the time interval to be measured. By utilizing a single vernier oscillator, the number of required components is reduced, and the necessity for additional frequency control is eliminated. Although the invention has been described with particular reference to the measurement of the interval between pulses, it is clear that the disclosed method and apparatus may be applied to other signals. It is also clear that periodic signals other than pulses may be utilized to perform the measurements. Furthermore, although counters which present the count in digital form are preferred, it is clear that analog counters may be utilized where desired without departing from the spirit and scope of the invention. It is therefore to be understood that, within the scope of the appended claims, the invention may be practiced otherwise than as specifically described.

What is claimed as new is:

1. Apparatus for measuring the time interval between first and second signals spaced from each other, said apparatus comprising a continuously running generator for generating a first series of periodic signals, a vernier signal generator responsive to the first and second signals for generating a second and third series of periodic signals, respectively, the periods of said second and third signals being the same, means coupled to said continuously running generator for producing an indication of the number of signals of said first series occurring during the time interval to be measured, and counting means coupled to said vernier signal generator for producing an indication representative of the time interval between the first signal and the initial signal of said first series occurring during the time interval to be measured, and of the time interval between the second signal and the final signal of said first series occurring during the time interval to be measured.

2. Apparatus according to claim 1 wherein the periods of said second and third series of signals are related to the period of said first series of signals in accordance with the relationship $$\frac{n+1}{n}$$

where $n$ is an integer.

3. Apparatus according to claim 1 wherein the periods of said second and third series of signals are related to the period of said first series of signals in accordance with the relationship $$\frac{n-1}{n}$$

where $n$ is an integer.

4. Apparatus for measuring the time interval between first and second signals spaced from each other, said apparatus comprising a continuously running generator for generating a first series of uniformly spaced pulses, a vernier pulse generator, means for triggering said vernier pulse generator in response to the first and second pulses to produce a second and third series of uniformly spaced pulses, respectively, the spacings between the pulses of said second and third series being equal and bearing a vernier relationship to the spacing between the pulses of said first series, means coupled to said continuously running generator for counting the number of pulses of said first series occurring during the time interval to be measured, and means coupled to said vernier pulse generator for counting the number of pulses of said second series occurring during the interval between the first pulse and coincidence between a pulse of said first series and a pulse of said second series, and for counting the number of pulses of said third series occurring during the interval between the second pulse and coincidence between a pulse of said first series and a pulse of said third series.

5. Apparatus according to claim 4, wherein the last named means comprises a single counter for producing a count equal to the difference between the counts of the number of pulses of said second and third series.

6. Apparatus for measuring the time interval between first and second signals spaced from each other, said apparatus comprising a continuously running generator for generating a first series of uniformly spaced pulses, a vernier pulse generator, means for triggering said vernier pulse generator in response to the first and second pulses to produce a second and third series of uniformly spaced pulses, respectively, the spacings between the pulses of said second and third series being equal and being related to the spacing between the pulses of said first series in accordance with the relationship $$\frac{n+1}{n}$$

where $n$ is an integer, means coupled to said continuously running generator for producing an indication of the number of pulses of said first series occurring during the time interval to be measured, and means coupled to said vernier generator for indicating the number of pulses of said second series occurring during the time interval between the first pulse and coincidence between a pulse of said first series and a pulse of said second series, and for indicating the number of pulses of said third series occurring during the interval between coincidence between a pulse of said first series and a pulse of said third series and the $n$th pulse of said third series.

7. Apparatus for measuring the time interval between first and second pulses spaced from each other, said apparatus comprising a continuously running generator for generating a first series of uniformly spaced pulses, a vernier pulse generator, means for triggering said vernier pulse generator in response to the first and second pulses to produce a second and third series of uniformly spaced pulses, respectively, the spacings between the pulses of said second and third series being equal, a unit pulse counter, means coupled between said vernier pulse generator and said unit pulse counter for counting the number of pulses of said second series occurring during the time interval between the first pulse and a first coincidence between a pulse of said first series and a pulse of said second series, means coupled between said continuously running generator and said unit pulse counter for counting the number of pulses of said first series occurring during the time interval between said first coincidence and a second coincidence between a pulse of said first series and a pulse of said third series, means coupled between said vernier pulse generator and said unit pulse counter for counting the number of pulses of said third series occurring during the interval between said second coincidence and the $n$th pulse of said third series, where $n$ is an integer, and means coupled to said vernier pulse generator for counting the number of pulses of said second series occurring during the interval between the first pulse and said first coincidence, and for counting the number of pulses of said third series occurring during the interval between the second pulse and said second coincidence.

8. Apparatus for measuring the time interval between first and second pulses spaced from each other, said apparatus comprising a continuously running generator for generating a first series of uniformly spaced pulses, a vernier pulse generator, means for triggering said vernier pulse generator in response to the first and second pulses to produce a second and third series of uniformly spaced pulses, respectively, the spacings between the pulses of said second and third series being equal, a unit pulse counter, means coupled between said vernier pulse generator and said unit pulse counter for counting the number of pulses of said second series occurring during the time interval between the first pulse and a first coincidence between a pulse of said first series and a pulse of said second series, means coupled between said continuously running generator and said unit pulse counter for counting the number of pulses of said first series occurring during the time interval between said first coincidence and a second coincidence between a pulse of said first series and a pulse of said third series, means coupled between said vernier pulse generator and said unit pulse counter for counting the number of pulses of said third series occurring during the interval between said second coincidence and the $n$th pulse of said third series where $n$ is an integer, a vernier pulse counter, and means coupled between said vernier pulse generator and said vernier pulse counter for producing a count in said vernier pulse counter of the number of pulses of said second series occurring during the interval between the first pulse and said first coincidence, and for producing a count in said vernier pulse counter of the number of pulses of said third series occurring during the interval between said second coincidence and the $n$th pulse of said third series.

9. Apparatus for measuring the time interval between first and second signals spaced from each other, said apparatus comprising a continuously running generator for generating a first series of periodic signals of a predetermined period, means coupled to said generator for producing an indication of the multiple number of said predetermined period occurring during the time interval to be measured, a single vernier signal generator for generating periodic signals of a period bearing a vernier relationship to said predetermined period, means for actuating said vernier signal generator in response to the first and second signals to produce a second and third series of periodic signals, respectively, and means coupled to said vernier signal generator for producing an indication of the fractional time interval remaining at each end of the time interval to be measured whenever the time interval to be measured is not exactly equal to a multiple number of said predetermined period.

10. Apparatus as defined in claim 9, wherein the last-named means includes first counting means coupled to said vernier signal generator for counting the number of signals generated by said vernier signal generator during the time interval between the first signal and a first coincidence between a signal from said continuously running generator and a signal from said vernier signal generator, and second counting means coupled to said vernier signal generator for counting the number of signals generated by said vernier signal generator during the time interval between the second signal and a second coincidence between a signal from said continuously running generator and a signal from said vernier signal generator.

11. Apparatus as defined in claim 9, wherein the last-named means includes a single counter and means for coupling said counter to said vernier signal generator to produce an indication on said counter of the summation of the fractional time interval between the first signal and the initial signal of said first series occurring during the time interval to be measured and the fractional time interval between the second signal and the final signal of the first series occurring during the time interval to be measured.

12. The method of measuring the time interval between a first and second signal spaced from each other wherein a single vernier signal generator is employed to measure the fractional time interval remaining whenever the time interval to be measured is not equal to a multiple number of the period of a continuously running signal generator, said method comprising the steps of producing a first indication representative of the number of signals of the continuously running generator occurring during the time interval to be measured, triggering the vernier signal generator by the first and second signals to produce a first and second series of periodic signals, respectively, producing a second indication representative of the fractional time interval between the first signal and the initial signal of the continuously running generator occurring during the time interval to be measured, and producing a third indication representative of the fractional time interval between the second signal and a final signal of the continuously running generator occurring during the time interval to be measured.

13. The method defined in claim 12 wherein the periods of said second and third series of signals are related to the period of the signals of said continuous running generator in accordance with the relationship $$\frac{n-1}{n}$$

where $n$ is an integer

14. The method defined in claim 12 wherein the periods of said second and third series of signals are related to the period of the signals of said continuous running generator in accordance with the relationship $$\frac{n+1}{n}$$

where $n$ is an integer.

WILLIAM E. FRADY, Jr.

References Cited in the file of this patent

UNITED STATES PATENTS

| Number | Name | Date |
|---|---|---|
| 2,504,852 | Lewis | Apr. 18, 1950 |
| 2,560,124 | Mofenson | July 10, 1951 |